(12) United States Patent
Pit et al.

(10) Patent No.: US 7,009,801 B2
(45) Date of Patent: Mar. 7, 2006

(54) METHOD AND APPARATUS FOR DYNAMICALLY ESTABLISHING ROLL STATIC ATTITUDE IN HARD DISK DRIVE

(75) Inventors: Remmelt Pit, Cupertino, CA (US); Mike Suk, San Jose, CA (US)

(73) Assignee: Hitachi Global Storage Technologies Netherlands, B.V., Amsterdam (NL)

(*) Notice: Subject to any disclaimer, the term of this patent is extended or adjusted under 35 U.S.C. 154(b) by 75 days.

(21) Appl. No.: 10/670,948

(22) Filed: Sep. 25, 2003

(65) Prior Publication Data
US 2005/0068655 A1 Mar. 31, 2005

(51) Int. Cl.
*G11B 21/02* (2006.01)
(52) U.S. Cl. .......................... 360/75; 360/76
(58) Field of Classification Search .............. 360/75, 360/76, 250, 254, 290, 294, 294.1, 294.4, 360/294.7, 234.6, 234.7, 265.1, 265.9, 245.7
See application file for complete search history.

(56) References Cited

U.S. PATENT DOCUMENTS

| | | | | |
|---|---|---|---|---|
| 5,021,906 A | 6/1991 | Chang et al. | | 360/103 |
| 5,289,325 A | 2/1994 | Morehouse et al. | | 360/105 |
| 5,313,352 A | 5/1994 | Chikazawa et al. | | 360/103 |
| 5,315,454 A | 5/1994 | Fukakusa | | 360/75 |
| 5,394,281 A | 2/1995 | Kajitani | | 360/105 |
| 6,301,080 B1 | 10/2001 | Boutaghou | | 360/255 |
| 6,362,933 B1 | 3/2002 | Sampietro et al. | | 360/105 |
| 6,433,966 B1 | 8/2002 | Tang et al. | | 360/235.4 |
| 6,437,948 B1 * | 8/2002 | Sugimoto | | 360/294.7 |
| 6,473,259 B1 | 10/2002 | Kuo et al. | | 360/75 |
| 6,535,355 B1 * | 3/2003 | Boutaghou et al. | | 360/245.7 |
| 6,757,124 B1 * | 6/2004 | Kelemen | | 360/75 |
| 6,765,765 B1 * | 7/2004 | Bement et al. | | 360/294.3 |
| 2001/0012182 A1 | 8/2001 | Boutaghou et al. | | 360/245.7 |
| 2002/0093769 A1 | 7/2002 | Suk et al. | | 360/255 |

FOREIGN PATENT DOCUMENTS

| | | |
|---|---|---|
| EP | 0 242 597 A2 | 3/1987 |
| JP | 57-210479 | 12/1982 |

(Continued)

OTHER PUBLICATIONS

"Ramp loading sweet spots". Yaeger and Hiller. Microsystem Technologies, vol. V.8, Pt No. 1, pp. 41-46, 2002.
"A Simplified 4-DOF Suspension Model for Dynamic Load/Unload Simulation and Its Application". Zeng et al. Transactions of the ASME Journal of Tribology, vol. 122, pp. 274-279, Jan. 2000.

(Continued)

*Primary Examiner*—David Hudspeth
*Assistant Examiner*—Jason Olson
(74) *Attorney, Agent, or Firm*—John L. Rogitz

(57) ABSTRACT

A hard disk drive establishes a roll static attitude (RSA) of a slider during operation to be zero during normal operation and to be non-zero during load/unload from a ramp. Specifically, a RSA bias mechanism such as a piezoelectric layer can be coupled to the slider suspension to bend the flexure of the suspension during load/unload so that the slider inner edge is higher than the outer edge. Consequently, any slider-disk contact that occurs during load/unload will be at the outer edge of the slider, where data is not expected to be on the disk.

8 Claims, 1 Drawing Sheet

FOREIGN PATENT DOCUMENTS

| | | |
|---|---|---|
| JP | 61194684 | 8/1986 |
| JP | 1166382 | 6/1989 |
| JP | 6076508 | 3/1994 |
| JP | 6267219 | 9/1994 |

OTHER PUBLICATIONS

"Development of a New Submicron Flying Ramp-Loading Head with Emphasis on Slider Roll Control Capability". Hashimoto et al. IEEE Transactions on Magnetics, vol. 28, No. 5 Pt. 2, pp. 2536-2538. Sep. 1992.

"Experimental Study of the Parameters That Determine Slider-Disk Contacts During Dynamic Loan-Unload". Jeong et al. Transactions of the ASME Journal of Tribology, vol. 114, No. 3, pp. 507-514. Jul. 1992.

"Simulations Uncover the Details of Load/Unload". Hua et al. Datatec Online, Edition 6, Section 5, pp. 101-104.

"Slider-Disk Contacts During the Loading Process in a Ramp-Load Magnetic Disk Drive". Ta-Chung Fu et al. ASME Advances in Information Storage Systems, vol. 6, pp. 41-54. 1995.

* cited by examiner

NORMAL OPERATION

LOAD/UNLOAD

METHOD AND APPARATUS FOR DYNAMICALLY ESTABLISHING ROLL STATIC ATTITUDE IN HARD DISK DRIVE

FIELD OF THE INVENTION

The present invention relates generally to hard disk drives.

BACKGROUND OF THE INVENTION

Hard disk drives (HDD), particularly those that are used in mobile computers, have to be designed to withstand the rough usage typically seen in the mobile environment. The shock robustness of such drives has improved primarily in the ability to withstand large shocks during the nonoperating mode. Typically, when not operating the slider assembly, which includes the read and write elements of the HDD, is "unloaded" by moving the slider onto a ramp near the outer diameter of the disk. In this way, in the event of shock the slider does not contact the disk, which could otherwise damage the slider and/or disk.

Before the drive is assembled, a slider orientation parameter referred to as "roll static attitude" (RSA) is set to zero on average, while a parameter referred to as "pitch static attitude" (PSA) is set slightly above zero on average (typically 100 min). What this means is that the slider has a slight pitch relative to the load beam of the suspension (non-zero PSA), i.e., the leading edge of the slider is slightly closer to the suspension than the trailing edge, whereas in the orthogonal dimension of roll the slider is parallel to the suspension (zero RSA, i.e., the radially outer edge of the slider is the same height as the radially inner edge).

With the above in mind, the present invention recognizes that during the load/unload process, it would be desirable to establish a non-zero RSA wherein the inner edge of the slider is closer to the load beam than the outer edge. With such a RSA, should the slider touch the disk during load/unload, it will be the outer edge of the slider that touches. Whatever damage to the disk that might occur consequently will happen almost just underneath the ramp, i.e., in a location beyond where data ordinarily is written. This in turn ensures that the risk of losing data due to slider-disk contact during load/unload is minimized or eliminated. The risk of flying over a damaged region of the disk is also reduced. Nonetheless, the present invention recognizes the desire to establish a zero RSA during normal operation for optimal performance.

SUMMARY OF THE INVENTION

A hard disk drive includes a rotatable disk, a slider juxtaposed with the disk, and a suspension holding the slider. A roll static attitude (RSA) bias mechanism is coupled, preferably to the flexure of the suspension, to establish a RSA of the slider.

In a preferred non-limiting embodiment, the RSA bias mechanism may include a piezoelectric structure bonded to the flexure part of the suspension. A HDD controller can be provided for actuating the RSA bias mechanism. The HDD controller can actuate the RSA bias mechanism to establish a zero RSA during read and write operations, and to establish a non-zero RSA during ramp load and unload operations. The non-zero RSA may be implemented during load/unload by actuating the RSA bias mechanism to bend the flexure to cause an inner edge of the slider to be higher relative to the disk than an outer edge of the slider.

In another aspect, a hard disk drive (HDD) includes a slider, a roll static attitude (RSA) bias mechanism coupled to the slider to turn the slider, and a controller actuating the RSA bias mechanism to establish a zero RSA during a first condition and a non-zero RSA during a second condition.

In still another aspect, a data storage device includes data storage means for storing data, and data transfer means juxtaposed with the data storage means for communicating data therebetween. Roll static attitude (RSA) biasing means establish a desired RSA. Logic means are provided for actuating the RSA biasing means to establish a non-zero RSA of the data transfer means at least during the first condition.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
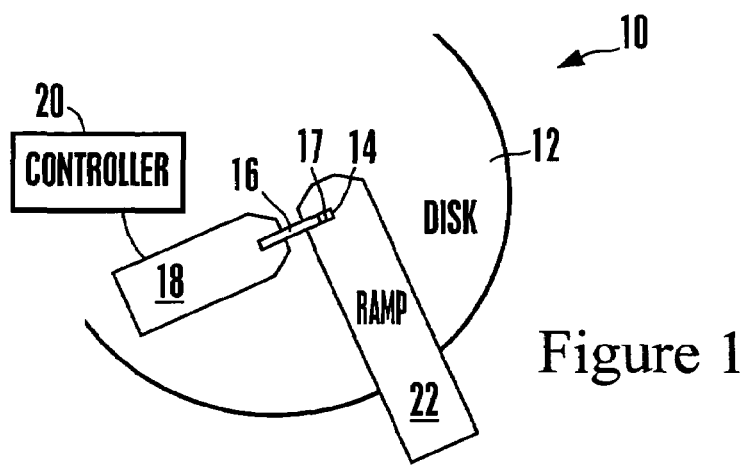
FIG. 1 is a top plan view showing the slider and suspension juxtaposed with a load/unload ramp and a disk.

Referring initially to FIG. 1, a hard disk drive (HDD) is shown, generally designated 10, which includes a rotatable hard disk 12 that can store data as written by a slider 14. The slider 14 is supported on a suspension 16, with the read and write heads being engaged with a flexure 17 of the suspension 16. The slider 14 can also read data from the disk 12. The suspension 16 can be engaged with a gimbal 18. A HDD controller 20 can control movement of the slider 14 relative to the disk 12, as well as effect reading and writing of data, in accordance with HDD principles known in the art. The HDD controller 20 may implement the dynamic roll static attitude (RSA) biasing logic described further below. When not operating the slider 14 can be unloaded onto a ramp 22 in accordance with principles known in the art. While only a single disk 12/slider 14 assembly is shown, it is to be understood that plural disks and associated sliders can be provided in the HDD 10.

Figure 2:
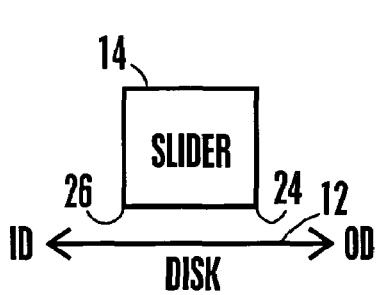
FIG. 2 is a front view of the slider looking at the leading edge during normal operation.
Figure 3:
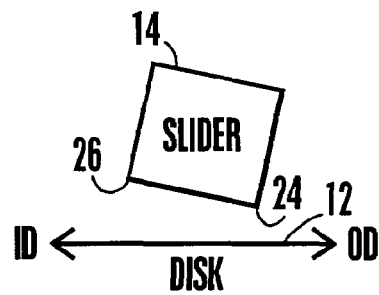
FIG. 3 is a front view of the slider looking at the leading edge during load/unload.

Now referring to FIG. 2, during operation the slider 14 preferably has a zero RSA, wherein the outer edge 24 of the slider 14 is the same height as the inner edge 26 of the slider 14 relative to the disk 12. In contrast, as shown in FIG. 3 during load/unload off of/onto the ramp 22, the slider 14 has a non-zero RSA, wherein the outer edge 24 of the slider 14 is closer to the disk 12 than is the inner edge 26. It may now be appreciated that should slider-disk contact occur during load/unload, it will occur at the outer edge 24, not the inner edge 26, i.e., at a disk location where data is not expected to be present.

Figure 4:
FIG. 4 is an elevational view of the suspension with a preferred non-limiting RSA bias mechanism being established by a layer of piezoelectric material.

FIG. 4 shows that in one non-limiting embodiment, a RSA bias mechanism can be implemented by a layer of piezoelectric material (PZT) 28 that is engaged with the suspension 16, preferably with the flexure 17 of the suspension 16. The PZT 28 may be a monomorph or bimorph or other piezoelectric structure that may be bonded to the flexure 17. When a voltage is applied to the PZT 28 as determined by the HDD controller 20 in accordance with the logic herein, the PZT 28 expands or contracts, bending at least a portion of the suspension 16 (e.g., the flexure 17) and, hence, establishing a predetermined RSA of the slider 14. If desired, the PZT 28 may not be bonded along its entire interface with the suspension 16 so that the PZT 28 may more freely deform in the desired direction. The particular type, orientation, and actuating voltages of the PZT 28 are selected as appropriate for the particular geometry of the HDD 10 and the desired RSA bias during load/unload.

Figure 5:
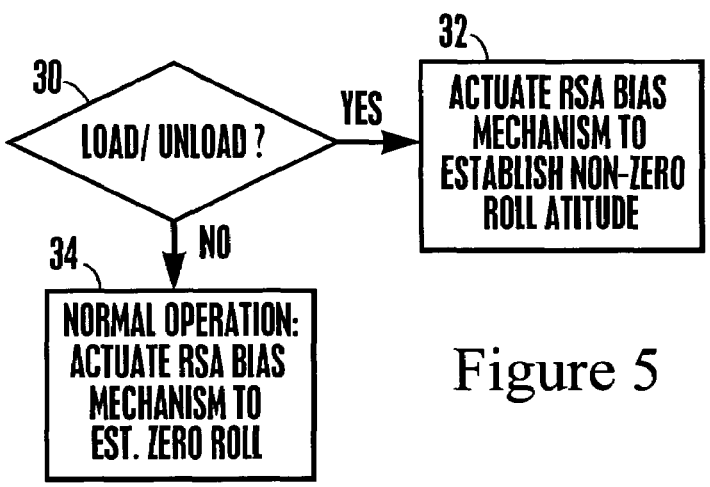
FIG. 5 is a flow chart of the present logic.

FIG. 5 shows the present logic. When it is determined (by, e.g., the HDD controller 20) at decision diamond 30 that the slider 14 is to be loaded off of or unloaded onto the ramp 22, the logic moves to block 32 to actuate the RSA bias mechanism to establish the non-zero RSA shown in FIG. 3. The actuation can be effected by, e.g., applying a predetermined voltage or removing voltage altogether from the preferred non-limiting PZT 28 shown in FIG. 4. In contrast, when it is determined that normal operation of the slider 14 is to be implemented, the logic flows to block 34 to actuate the RSA bias mechanism as appropriate to establish the zero RSA of the slider 14 shown in FIG. 2.

As examples, the head assembly can be biased such that when no voltage is applied to the PZT 28, a non-zero RSA is assumed, with a zero RSA being established by energizing the PZT 28 against the bias. In this example, in case of emergency power off, the correct non-zero RSA is established for unloading by the material bias of the head assembly. Or, the opposite could be effected, wherein the head assembly is materially biased with a zero RSA and energizing the PZT 28 results in establishing a non-zero RSA, so that power is saved by not requiring PZT 28 voltages during operation.

In addition to the above, the RSA may be incrementally established based on head radial location over the disk as appropriate to decrease magnetic spacing and/or to increase clearance. The desired RSA values and/or corresponding PZT 28 voltages can be accessed using an empirically generated lookup table for various radial positions of the head.

While the particular METHOD AND APPARATUS FOR DYNAMICALLY ESTABLISHING ROLL STATIC ATTITUDE IN HARD DISK DRIVE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A hard disk drive, comprising:
   at least one rotatable disk;
   at least one slider juxtaposed with the disk;
   a suspension holding the slider;
   a roll static attitude (RSA) bias mechanism coupled to the suspension to establish a RSA of the slider:
   a HDD controller executing a program to actuate the RSA bias mechanism to establish a zero RSA during read and write operations and to otherwise establish a non-zero RSA during ramp load and unload operations.

2. The disk drive of claim 1, wherein the RSA bias mechanism includes at least one piezoelectric structure bonded to the suspension.

3. The disk drive of claim 1, wherein the RSA is implemented by actuating the RSA bias mechanism to bend a flexure of the suspension to cause an inner edge of the slider to be higher relative to the disk than an outer edge of the slider during load and unload operations.

4. A bard disk drive (HDD) comprising:
   at least one slider;
   at least one roll static attitude (RSA) bias mechanism coupled to the slider to turn the slider; and
   at least one controller actuating the RSA bias mechanism to establish a RSA based on making a determination whether the slider is being loaded/unloaded or is in data communication with the disk.

5. The HDD of claim 4, wherein a non-zero RSA is implemented by actuating the RSA bias mechanism to bend a flexure associated with the slider to cause an inner edge of the slider to be higher relative to a data storage surface than an outer edge of the slider when it is determined that the slider is being loaded/unloaded.

6. The disk drive of claim 4, wherein the RSA bias mechanism includes at least one piezoclectric structure bonded to a suspension associated with the slider.

7. A data storage device, comprising:
   data storage means for storing data;
   data transfer means juxtaposed with the data storage means for communicating data therebetween;
   roll static attitude (RSA) biasing means for establishing a RSA of the data transfer means; and
   logic means for actuating the RSA biasing means to establish a RSA of the data transfer means depending on whether or not the data transfer means is being loaded/unloaded, the logic means being programmed to establish a non-zero RSA wherein an inner edge of the data transfer means is higher relative to the data storage means than is an outer edge of the data transfer means during load/unload, the logic means being programmed to establish a zero RSA of the data transfer means when the data transfer means is communicating with the data storage means.

8. The data storage device of claim 7, wherein the RSA biasing means is established at least in part by a piezoelectric element.

* * * * *